US012580953B2

(12) United States Patent 
Aviv et al.

(10) Patent No.: US 12,580,953 B2 
(45) Date of Patent: Mar. 17, 2026

(54) METHOD AND SYSTEM FOR DETECTING ENCRYPTED FLOOD ATTACKS

(71) Applicant: Radware Ltd., Tel Aviv (IL)

(72) Inventors: David Aviv, Tel Aviv (IL); Ehud Doron, Moddi'in (IL); Gabi Nakibly, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 175 days.

(21) Appl. No.: 18/350,794

(22) Filed: Jul. 12, 2023

(65) Prior Publication Data

US 2024/0163309 A1      May 16, 2024

Related U.S. Application Data

(60) Provisional application No. 63/383,625, filed on Nov. 14, 2022.

(51) Int. Cl.
 *H04L 9/40* (2022.01)
(52) U.S. Cl.
 CPC ...... *H04L 63/1458* (2013.01); *H04L 63/1416* (2013.01); *H04L 63/1425* (2013.01)
(58) Field of Classification Search
 CPC ............. H04L 63/1416; H04L 63/1425; H04L 63/1458
 See application file for complete search history.

(56) References Cited

U.S. PATENT DOCUMENTS

| | | | |
|---|---|---|---|
| 8,307,430 B1* | 11/2012 | Chen ................... | H04L 63/1458 726/22 |
| 9,749,340 B2 | 8/2017 | Huston, III | |
| 11,363,044 B2 | 6/2022 | Doron et al. | |
| 11,552,989 B1 | 1/2023 | Doron et al. | |
| 11,582,259 B1 | 2/2023 | Doron et al. | |
| 2004/0037229 A1* | 2/2004 | D'Souza ................ | H04L 43/00 370/252 |
| 2008/0086435 A1* | 4/2008 | Chesla .................. | H04L 63/168 706/12 |
| 2019/0068624 A1 | 2/2019 | Compton | |
| 2020/0412750 A1* | 12/2020 | Doron ................. | H04L 63/1425 |
| 2021/0194903 A1* | 6/2021 | Medvedovsky .... | H04L 63/1416 |

* cited by examiner

*Primary Examiner* — Thomas J Dailey
(74) *Attorney, Agent, or Firm* — M&B IP Analysts, LLC

(57) ABSTRACT

A system and method for detecting HTTPS flood cyber-attacks. A method includes deriving traffic features from incoming traffic directed to a protected entity; determining if the derived traffic features represent at least one traffic anomaly, wherein the traffic anomaly is a deviation from at least one baseline, wherein the baseline is a normal distribution of traffic features of legitimate incoming traffic; upon determining that the derived traffic features represent at least one anomaly, determining if the anomaly characterizes an on-going HTTPS flood cyber-attack; upon determining that there is the on-going HTTPS flood cyber-attack, populating a list of suspect source internet protocol (IP) addresses of devices triggered detection of the anomaly; challenging each device in the list of suspect source IP addresses to determine if a challenged device is an attack tool; and causing execution of a mitigation action on each client device determined to be an attack tool.

23 Claims, 7 Drawing Sheets

METHOD AND SYSTEM FOR DETECTING ENCRYPTED FLOOD ATTACKS

CROSS-REFERENCE TO RELATED APPLICATIONS

This application claims the benefit of Provisional Patent Application No. 63/383,625 filed on Nov. 14, 2022, now pending. The contents of the above-referenced application are hereby incorporated by reference.

TECHNICAL FIELD

This present disclosure generally relates to techniques for protecting network and computing resources from attacks performed using cryptographic protocols, and specifically for detecting anomalous encrypted traffic behavior for flash crowd attacks.

BACKGROUND

These days, on-line businesses and organizations are vulnerable to malicious attacks. Recently, cyber-attacks have been committed using a wide arsenal of attack techniques and tools targeting both the information maintained by the on-line businesses and their IT infrastructure. Hackers and attackers are constantly trying to improve their attack strategies to cause irrecoverable damage, overcome current deployed protection mechanisms, and so on.

For example, recently identified attacks were committed through cryptographic protocols including, but not limited to: transport layer security (TLS), secure socket layer (SSL), Hyper Text Transfer Protocol Secure (HTTPS), and the like. An example of such attacks is the encrypted denial-of service (DoS) or encrypted distributed DoS (DDoS) attacks.

Typically, a DoS/DDoS attack is an attempt to make a computer or network resource unavailable or idle. A common technique for executing DoS/DDoS attacks includes saturating a target victim resource (e.g., a computer, a WEB server, an API server, a WEB application, and the like), with external requests. As a result, the target victim becomes overloaded, thus it cannot respond properly to legitimate traffic. When the attacker sends many applicative, or other, requests to a single network adapter, each victim resource would experience effects from the DoS attack. A DDoS attack is performed by controlling many machines and directing them to attack as a group. Various techniques for mitigating non-encrypted DoS/DDoS attacks are discussed in the related art. However, there are no efficient solutions for detecting application-layer encrypted DoS/DDoS attacks.

An encrypted DoS/DDoS is performed against victim resources having an encrypted connection with their clients or over an encrypted communication protocol. An example for the encrypted DoS/DDoS is an HTTPS flood attack, as it is based on HTTP communications over a TLS/SSL encryption protocol.

In the HTTPS flood attacks, attackers manipulate HTTP GET and POST unwanted requests in order to attack, or to overload, a victim resource. These attacks often use interconnected computers that have been taken over with the aid of malware, such as Trojan Horses as part of an organized BotNet. HTTPS flood attacks require less bandwidth to attack the targeted sites or servers, because they target victim resources, not the networking infrastructure itself. For this reason, the HTTPS floods are more difficult to detect using simple means. HTTPS flood attacks are one of the most advanced threats facing web servers today as it is difficult to distinguish between legitimate and malicious HTTPS traffic.

HTTPS flood attacks cannot be detected and mitigated by mere use of the conventional techniques for mitigating non-encrypted DoS/DDoS attacks. This is due to the fact that current detection techniques typically are not adapted to decrypt the encrypted traffic as this typically requires private encryption keys and computing power that is able to decrypt information encapsulated in the headers of transported HTTP packets. In addition, the need to constantly decrypt high volumes of traffic might, by itself, lead to denial-of-service conditions.

Further, since HTTPS flood attacks employ legitimate-appearing requests with or without high volumes of traffic, it is difficult to differentiate such requests from valid traffic. Thus, such types of DDoS attacks are among the most advanced non-vulnerable security challenges facing servers and applications today.

During recent years, the majority of Internet services have been based on encrypted WEB traffic, e.g., HTTPS. The inability to detect and mitigate HTTPS flood attacks significantly impacts online businesses that use cryptographic protocols. Such attacks greatly exploit computing resources because encrypted traffic requires more resources for processing. For example, decryption of encrypted traffic by a targeted server consumes more CPU resources than the processing of a non-encrypted traffic. Thus, even a "small scale" encrypted attack can cause a targeted server to become unresponsive. Efforts to reduce computing resources have been made by exploring methods to detect cyber-attacks without decryption of traffic. However, it has been identified that detecting cyber-attacks from encrypted traffic without knowing the content raises other challenges, particularly in distinguishing heavy legitimate traffics of regular client requests from Dos/DDoS attacks.

It would be, therefore, advantageous to provide an efficient security solution for detecting and mitigating attacks of HTTPS flood attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting HTTPS flood cyber-attacks. The method comprises: deriving traffic features from incoming traffic directed to a protected entity; determining if the derived traffic features represent at least one traffic anomaly, wherein the at least one traffic anomaly is a deviation from at least one baseline, wherein the at least one baseline is a normal distribution of traffic features of legitimate incoming traffic directed to the protected entity; upon determining that the derived traffic features represent at least one anomaly, determining if the at least one anomaly characterizes an on-going HTTPS flood cyber-attack; upon determining that there is the on-going HTTPS flood cyber-attack, populating a list of suspect source internet protocol (IP) addresses of devices triggered detection of the at least one anomaly; challenging each device in the list of suspect source IP addresses to determine if a challenged device is an attack tool; and causing execution of a mitigation action on each client device determined to be an attack tool.

Certain embodiments disclosed herein also include a non-transitory computer readable medium having stored thereon instructions for causing a processing circuitry to execute a process, the process comprising: deriving traffic features from incoming traffic directed to a protected entity; determining if the derived traffic features represent at least one traffic anomaly, wherein the at least one traffic anomaly is a deviation from at least one baseline, wherein the at least one baseline is a normal distribution of traffic features of legitimate incoming traffic directed to the protected entity; upon determining that the derived traffic features represent at least one anomaly, determining if the at least one anomaly characterizes an on-going HTTPS flood cyber-attack; upon determining that there is the on-going HTTPS flood cyber-attack, populating a list of suspect source internet protocol (IP) addresses of devices triggered detection of the at least one anomaly; challenging each device in the list of suspect source IP addresses to determine if a challenged device is an attack tool; and causing execution of a mitigation action on each client device determined to be an attack tool.

Certain embodiments disclosed herein also include a system detection of HTTPS flood cyber-attacks. The system comprises: a processing circuitry; and a memory, the memory containing instructions that, when executed by the processing circuitry, configure the system to: derive traffic features from incoming traffic directed to a protected entity; determine if the derived traffic features represent at least one traffic anomaly, wherein the at least one traffic anomaly is a deviation from at least one baseline, wherein the at least one baseline is a normal distribution of traffic features of legitimate incoming traffic directed to the protected entity; upon determination that the derived traffic features represent at least one anomaly, determine if the at least one anomaly characterizes an on-going HTTPS flood cyber-attack; upon determination that there is the on-going HTTPS flood cyber-attack, populate a list of suspect source internet protocol (IP) addresses of devices triggered detection of the at least one anomaly; challenge each device in the list of suspect source IP addresses to determine if a challenged device is an attack tool; and cause execution of a mitigation action on each client device determined to be an attack tool.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
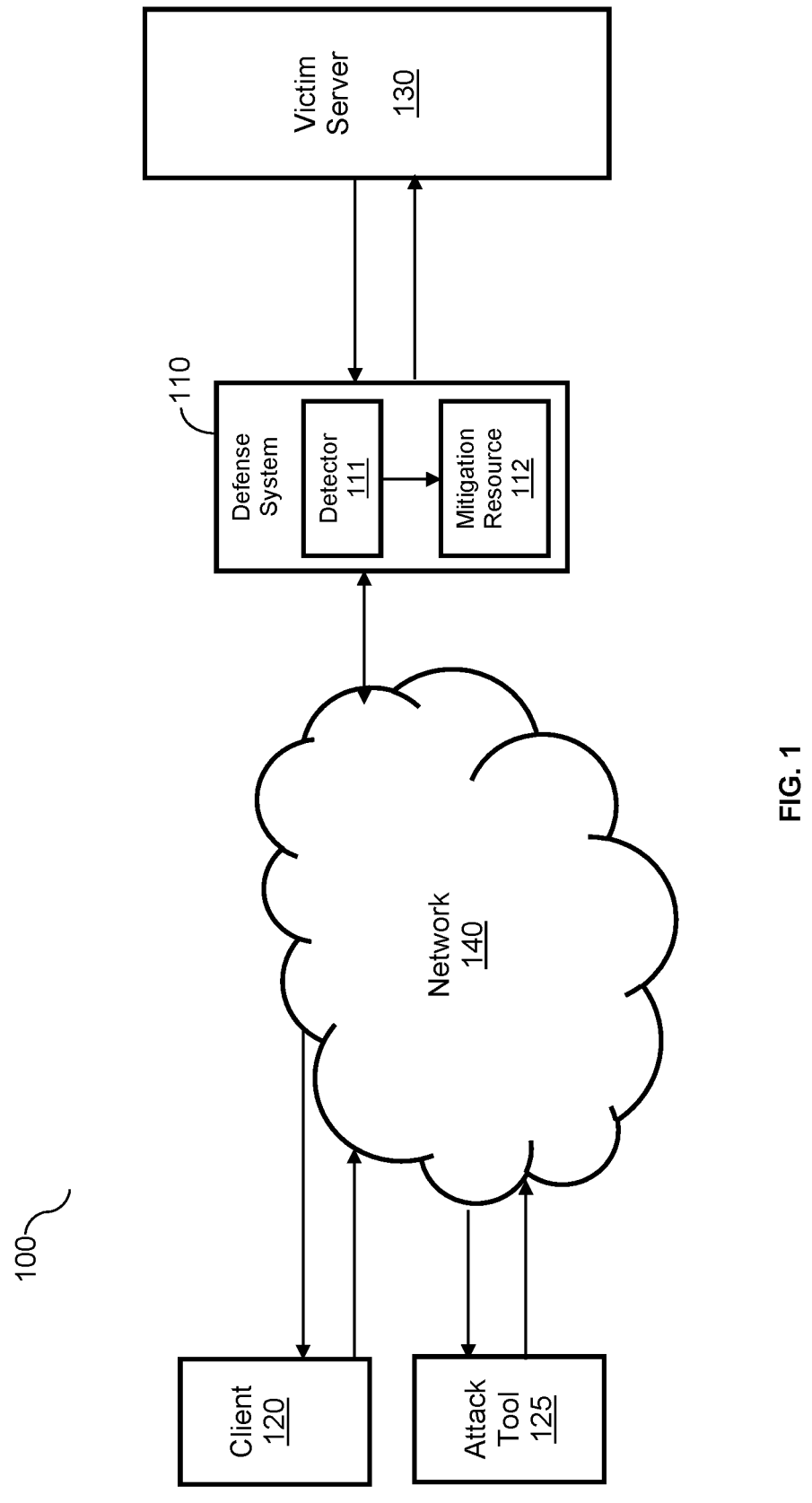
FIG. 1 illustrates an inline deployment of a defense system for detecting HTTPS flood attacks according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

FIG. 1 is a schematic diagram 100 illustrating a defense system 110 for detecting and mitigating HTTPS flood attacks according to some embodiments. In the schematic diagram 100, client devices 120 and 125 communicate with a server 130 over a network 140. In order to demonstrate the disclosed embodiments, the client device 120 is a legitimate client (operated by a real user), the client device 125 is an attack tool (operated, for example, by a bot), and the server 130 is a "victim server", i.e., a server 130 under attack.

The attack tool 125 carries out the malicious attacks against the victim server 130, and particularly carries out HTTPS flood attacks. The attack tool 125 can be a dedicated tool for performing the encrypted attack operating from an infected device. It should be noted that the embodiments disclosed herein are applied when multiple attack tools execute the attacks against the victim server 130 concurrently. Thus, the embodiments disclosed herein can also be used to detect and mitigate a large-scale attack campaign where a vast number of attack tools participate in attacking the protected entity, i.e., the victim server 130. Similarly, a vast number of legitimate client devices 120 can operate concurrently to be delivered with the services proposed by the server 130. Both client devices 120 and 125 can reach the victim server 130 concurrently. The network 140 may be, but is not limited to, a local area network (LAN), a wide area network (WAN), the Internet, a cellular network, and a metropolitan area network (MAN), wireless network, IoT network, or any combination thereof.

Figure 2:
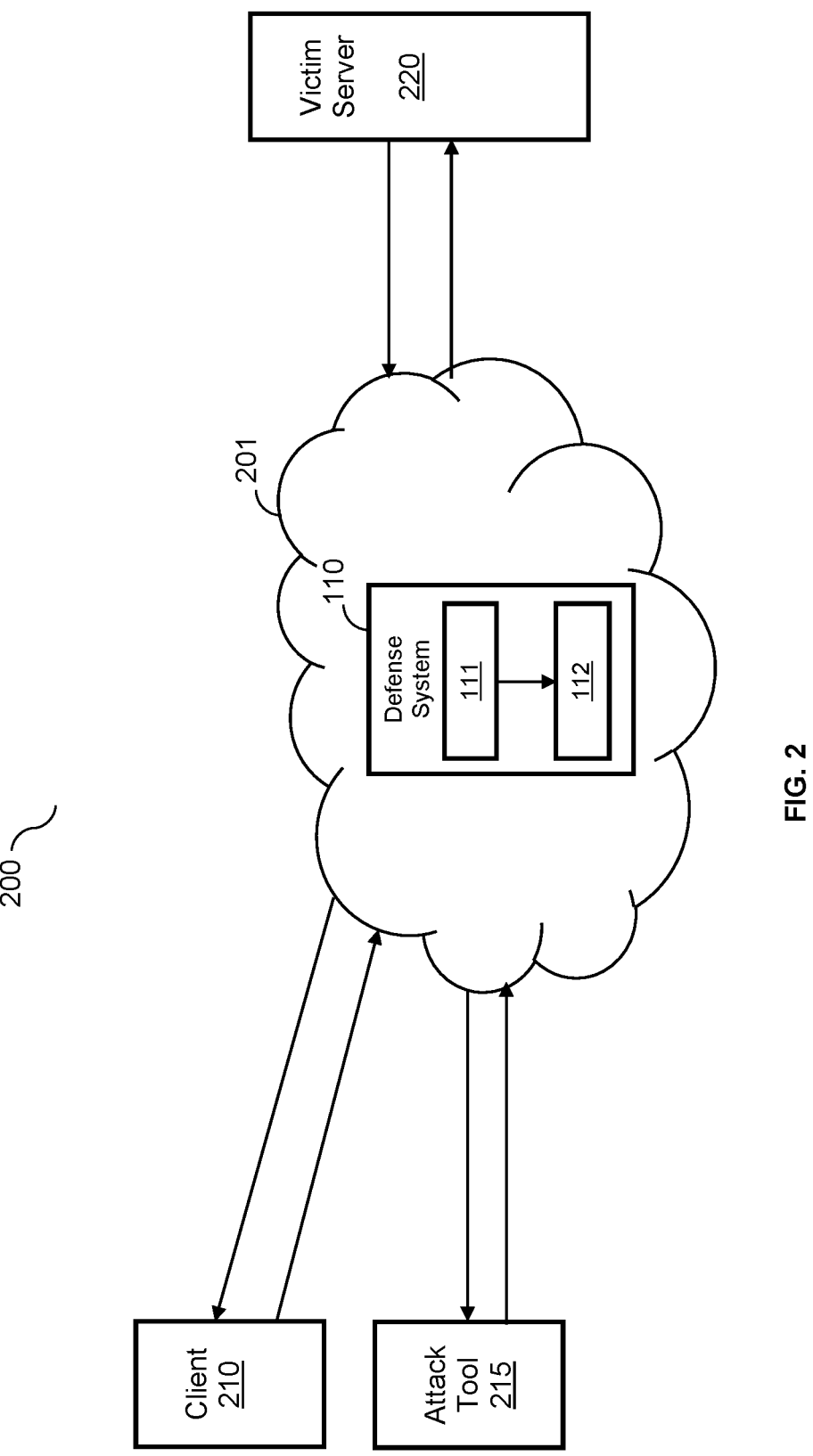
FIG. 2 illustrates an always-on deployment of a defense system for detecting HTTPS flood attacks according to one embodiment.

According to the disclosed embodiments, the defense system 110 is deployed in-line between the client 120, attack tool 125 and victim server 130. The defense system 110 and the victim server 130 may be deployed in a cloud computing platform and/or in an on-premise deployment, such that they collocate together. The cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, when installed in the cloud, the defense system 110 may operate as a SaaS. In some configurations, the defense system 110 can also be deployed in a protection cloud platform as shown in FIG. 2, as an always-on protection.

According to the disclosed embodiments, the defense system 110 includes a detector 111 and a mitigation resource

US 12,580,953 B2

5

6

112. The detector 111 in the defense system 110 is configured to inspect traffic flows between the client device 120, attack tool 125 and the victim server 130 to detect encrypted DDoS attacks, and in particular HTTPS flood attacks. In other configurations, only ingress traffic from the client device 120 and attack tool 125 to the server 130 is inspected.

The mitigation resource 112 is configured to perform one or more mitigation actions, triggered by the detector 111, to mitigate a detected attack. The mitigation resource may be, but is not limited to, a scrubbing center. In another embodiment, the mitigation resource 112 is a multi-tiered mitigation system. The arrangement, configuration and orchestration of a multi-tiered mitigation system is disclosed in U.S. Pat. No. 9,769,201, assigned to the common assignee, which is hereby incorporated herein by reference.

The victim server 130 is the entity to be protected from malicious threats. The server 130 may be a physical or virtual entity (e.g., virtual machine, a software container, a serverless function, and the like). The communication with the victim server 130 is over an application-layer cryptographic protocol, such as HTTPS, based on any version of encryption protocol such as SSL, TLS, QUIC, and the like.

The victim server 130 may be a WEB server (e.g., a server under attack, WEB application under attack, API server, and so on). The attack tool 125 may be, for example, ddosim, LOIC, HULK, PyLoris, GoldeEye and the like. Such tools allow attackers to control HTTP Verbs to be used (GET, POST etc.), rate of HTTP requests, interval between HTTP requests, delay between SYN packets, Source IPs, range and distribution, using WEB proxies for attack distribution, number of concurrent TCP connections, number of sockets, URLs, random URLs to mimic legitimate user behavior, and/or to malform crafted HTTPS requests.

The defense system 110 is configured to inspect egress and ingress traffic from both the client device 120, the attack tool 125, and the victim server 130. The inspected traffic is analyzed to determine abnormal activity based on one or more traffic features of the inspected traffic. The traffic features may include rate-based traffic features and the rate-invariant traffic features that demonstrate behavior of HTTPS traffic directed to the victim server 130.

Some example traffic features include ingress traffic from the client device 120 to the victim server 130 is analyzed to determine a number of HTTPS requests per second: RPS, (as a rate-based feature) and the distribution (average) of HTTPS request size (as a rate-invariant feature). Further, egress traffic, from the victim server 130 to the client device 120 and the attack tool 125, is analyzed to determine the volume of HTTPS response sizes, as the responses number of bytes per second (rate-based features) and the distribution (average) of HTTPS response size (rate-invariant feature).

According to the disclosed embodiments, the ingress traffic is utilized to determine distributions of packet arrival times and packet interarrival times (time between pair of consecutive data packets), both of which are rate-based traffic features. In addition, ingress traffic is utilized to determine a rate-invariant traffic feature of packet sizes. In an embodiment, the defense system 110 is configured to capture and/or receive traffic data including, without limitation, 5-tuple, packet size, arrival time, TCP flags, and the like, to determine various traffic features. In a further embodiment, the ingress traffic data includes, for example, but is not limited to, HTTPS requests, ACK packets, SYN packets, SYN/ACK packets, and more. It should be noted that ingress traffic flows through the detector 111 and the mitigation resource 112.

In an embodiment, traffic features include determining histograms reflecting distribution of packet arrival times and the interarrival times of consecutive data packets from traffic data. Each histogram is determined based on a predetermined number of packets. The packets are distributed into several bins according to their times (e.g., arrival time, interarrival time) so that each bin represents a normalized probability of requests for the respective time bins. In another embodiment, each histogram is determined based on a plurality of packets that are received within a predetermined time period (e.g., 5 seconds).

In an embodiment, the arrival times of the packets are converted to frequency domains by Fast Fourier Transformation (FFT) for analysis. It is assumed that HTTPS requests from attack tools are sent at the highest rate possible and thus, reflect steady, and possibly high, request rates. Such steady request rates may be detected upon comparing to distribution of packets at peace time when requests are generated from legit clients. In an example embodiment, packets from a legit client shows sporadic arrival times as different actions (e.g., requests) are taken by legitimate users on, for example, an application. In another example embodiment, a consistent request arrival rate is detected in the frequency domain histogram (e.g., high amplitude for specific frequencies) when an attack, for example a DDos attack, is directed to the victim server.

In an embodiment, interarrival time is defined as an arrival time difference between two consecutive packets. That is, a void time from arrival of a first packet until the arrival of a second packet of the consecutive pair of packets. It is assumed that an attack tool continuously sends HTTPS requests at high rates to saturate ingress and egress traffic. To this end, a steady packet rate from an attack may be reflected as concentration of interarrival times in certain bins on the generated histogram of the traffic feature. For example, a notable high number of packet pairs identified in one interarrival time bin relative to a baseline histogram may be determined as an anomaly to suggest an attack.

In an embodiment, consecutive pairs of packets are from same TCP/UDP sessions. In another embodiment, consecutive pairs of packets are of same sources, for example without limitation, content delivery network (CDN), IP sources, and the like. In yet another embodiment, the consecutive pairs of packets are aggregated from all traffic arriving at the defense system.

In order to allow simple and efficient detector and mitigator deployment, all such measurements are analyzed without decrypting the contents of the data packets and/or extracting headers of HTTPS requests or responses. Further, the disclosed embodiments allow for eliminating the need for decryption for the task of attack detection, simplifying the implementation of the defense system 110, and minimizing the usage of private keys by the defense system 110.

As will be discussed below, HTTPS flood attacks may be detected based on anomalies of each feature or based on a combination of these traffic features. In an embodiment, an anomaly is detected based on baselines generated for the measurement of normal users' behavior, as defined according to the above features. Any deviation that persists from the normal baseline is detected as an abnormal event. The normal behavior may be represented by normal access patterns of the legitimate user using client device 120 to the victim server 130.

The normal behavior, of each feature, can be varied among multiple servers (not shown) and may also have hourly and or weekly behavior patterns. For example, high traffic loads can be observed during late morning time in comparison to very low traffic volumes during late night-time. Similarly, traffic loads can differ on regular working days compared to weekends. As such, the baseline computation is adapted to hourly changes in traffic, while eliminating attack patterns which are considered to introduce HTTPS floods as fast increments in the load of traffic, for the ingress or egress traffic. It should be emphasized that a deviation from the normal baselines is defined uniquely for the rate-based and rate-invariant features. Such deviation is detected as an abnormal event.

In an embodiment, upon detection of HTTPS flood attacks, a "suspect list" is generated, by the detector 111, as a complementary action of the attack detection. The "suspect list" which includes a list of source IPs of web clients with detected anomaly behavior. The source IPs may be challenged to determine which of the source is a real attacker, an attack tool like 125, or a legitimate client device 120.

A mitigation action may be performed, by the mitigation resource 112, on the attacker. For example, both the client device 120 and the attack tool 125 may be included in the suspect list, but after the challenges, only the attack tool 125 will remain suspect and therefore will be considered as an attacker and its traffic is to be mitigated. The client devices 120 and 125 can be challenged using encrypted client web challenges, such as, but not limited to, a 302 HTTP redirect message, a redirect script, and a CAPTCHA challenge. Examples for such challenges are described in U.S. Pat. No. 8,832,831, assigned to the common assignee and hereby incorporated by reference.

In yet another embodiment, the mitigation action may include limiting the traffic or blocking the traffic completely. The action is performed against traffic originating from the performance of any device listed in the suspect list that has failed the challenge(s).

The building of the suspect list for mitigating attacks is based on the fact that legitimate users may be characterized by a typical access pattern when accessing the victim server 130. The patterns can be characterized by an average rate of HTTPS requests and their volumes and sizes, also by an average volume of responses, the variability of HTTPS requests rate and volumes, the variability of HTTPS responses volumes, the ratio between rate of HTTPS requests (per second) and the volume of HTTPS response. All these traffic features are reflected by, for example, the set of URLs which are commonly visited, and their sizes as affect the HTTPS requests sizes, cookies patterns that are being used, TLS/SSL headers, the structure of HTTP headers and so on.

In an embodiment, the attack tool generating HTTPS requests, and the corresponding responses, will increase the normal probability of requests or sizes of packets by generating and sending continuous HTTPS requests at a high rate. In another embodiment, bins in the histogram that were merely empty at peace time, begin to have a reasonable normalized probability.

In an embodiment, an attacker executing a HTTPS flood attack can reasonably take one, or more, of the following strategies: generate a large number of requests, generate a large number of request at high request rates, generate requests to abnormal (e.g. smaller or larger, in terms of the size of the HTTPS requests or/and response these URLs introduced, using HTTP Cookie or not) number of URLs, other group of URLs, and the like.

It should be noted that an attacker executing a HTTPS flood and its behavior cannot reasonably follow similar statistics patterns as legitimate client devices can. The behaviors of legitimate clients and attackers influence, in a different way, the rates (e.g., RPS, arrival times, interarrival times, and the like), and sizes (distribution) of HTTPS requests and responses and, further, influence the momentary structure of the request size and response size distributions, and the variability of corresponding HTTPS requests and responses rates and loads.

Therefore, in order to detect HTTPS flood attacks, the defense system 110 is configured to compare features of inspected traffic to the legitimate traffic patterns (or their normal baseline).

Specifically, the inspected traffic features would allow for detecting attacks committed using, for example, the attack strategies mentioned above. The main objective would be to be able to handle HTTPS floods on the ingress side (client to server), the egress side (server to client), or both. That is, the rate-based features would allow for detecting abnormal (e.g., large, steady, concentrated) number of HTTPS requests (of data packets) and requests to URLs with large responses or even with relatively small responses and many other attack approaches.

As an example, determining abnormal activity from traffic features of arrival times and interarrival times are discussed. A traffic data including packet arrival times of 7 packets are shown below in Table 1. The arrival times may be captured and recorded for ingress traffic from both the client device 120 and the attack tool 125 to the victim server 130. It should be noted that the traffic data includes for example, but not limited to, HTTPS requests, SYN packets, ACK packets, the like, and more.

TABLE 1

| Arrival times (Second) |
| --- |
| 1534.1 |
| 1534.3 |
| 1534.9 |
| 1535.3 |
| 1535.4 |
| 1536.1 |
| 1538.2 |

Figure 4:
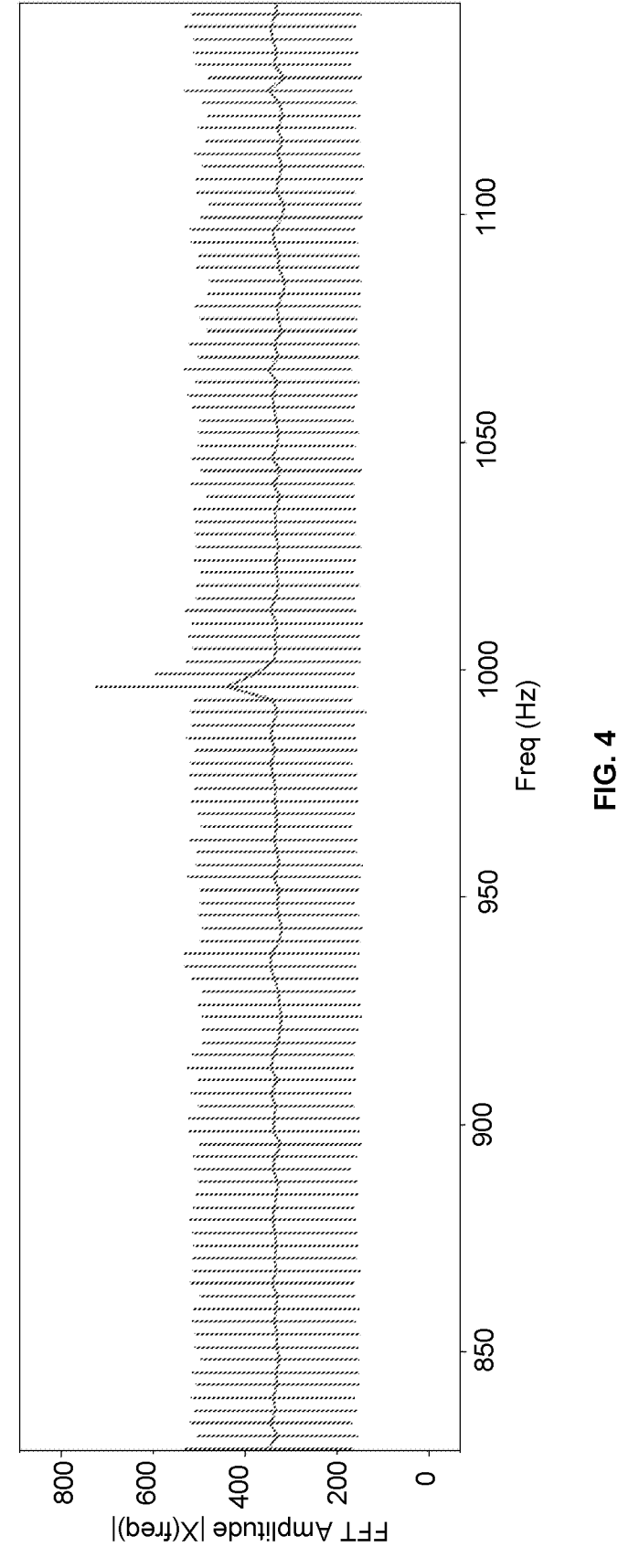
FIG. 4 is a diagram illustrating a distribution of packet arrival times in an example embodiment.

In the same example, the received traffic data are distributed into bins of packet arrival times as shown in Table 2. Here, the bin sizes are each 1 second to include the plurality of packets received within the corresponding second. For example, bin 1534 includes 2 packets that had arrival times of 1534.1 and 1534.3 seconds. It should be noted that the bin sizes are predetermined and may be updated intermittently. As noted above, a histogram (or plot) for the predetermined period of time is generated. In a further embodiment, arrival times are analyzed in the frequency domain through FFT analysis. An example diagram illustrating a frequency distribution of packet arrival times is shown in FIG. 4.

TABLE 2

| Bin | Number of Packets |
| --- | --- |
| 1534 | 2 |
| 1535 | 3 |
| 1536 | 1 |
| 1537 | 0 |
| 1538 | 1 |

Figure 5:
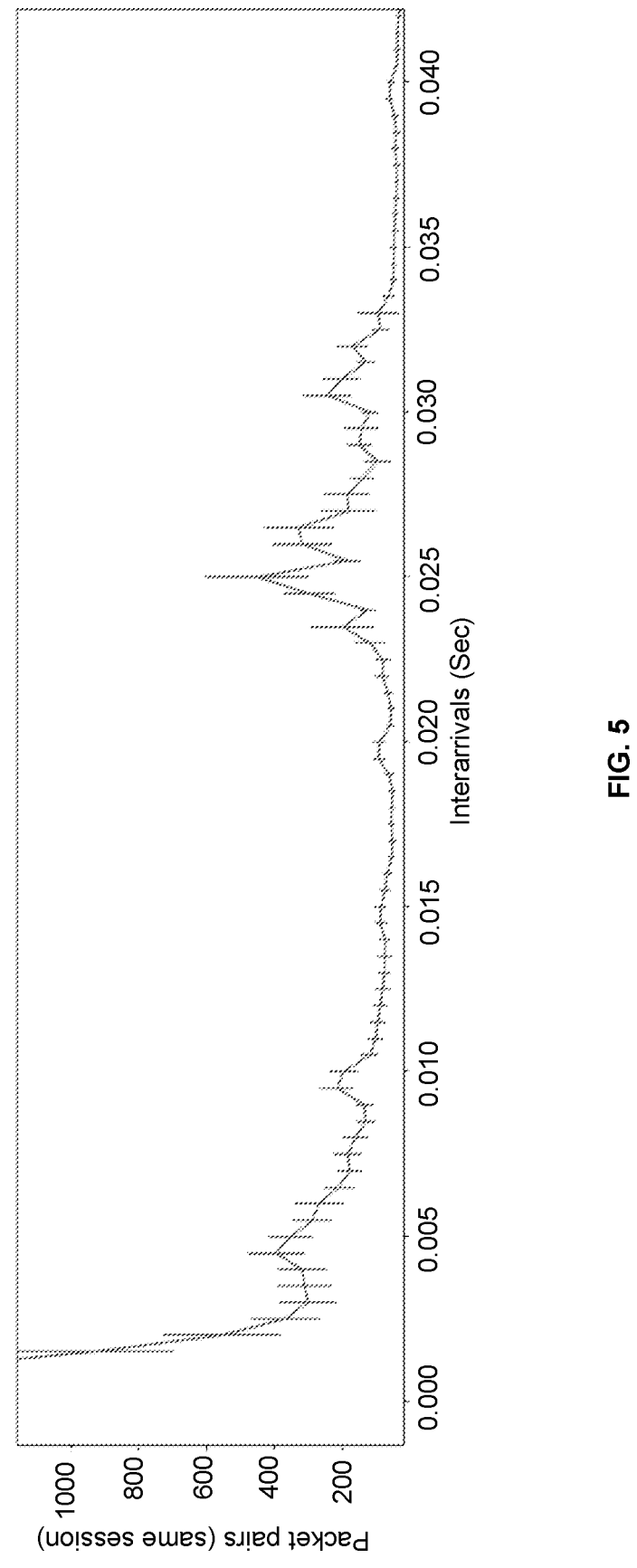
FIG. 5 is a diagram illustrating a distribution of interarrival times in an example embodiment.

In addition, a distribution of interarrival times using the same example traffic data, shown in Table 1, is described. The interarrival times, that is the time between two consecutive packet arrival times, are determined as shown in Table 3 to result 6 interarrival time data from the traffic data of Table 1. For example, the first interarrival time of 0.2 seconds is determined between the first two arrival times, 1534.1 and 1534.3 seconds, of Table 1. These interarrival times are distributed into predetermined arrival time bins as shown in Table 4 for generation of an interarrival time histogram. An example plot illustrating a distribution of interarrival times for pairs of packets is shown in FIG. 5.

TABLE 3

| Interarrival times (seconds) |
| --- |
| 0.2 |
| 0.6 |
| 0.4 |
| 0.1 |
| 0.7 |
| 1.9 |

TABLE 4

| Bin | Number of Packets |
| --- | --- |
| 0 | 2 |
| 0.5 | 4 |
| 1 | 0 |
| 1.5 | 0 |
| 2 | 1 |

Figure 6:
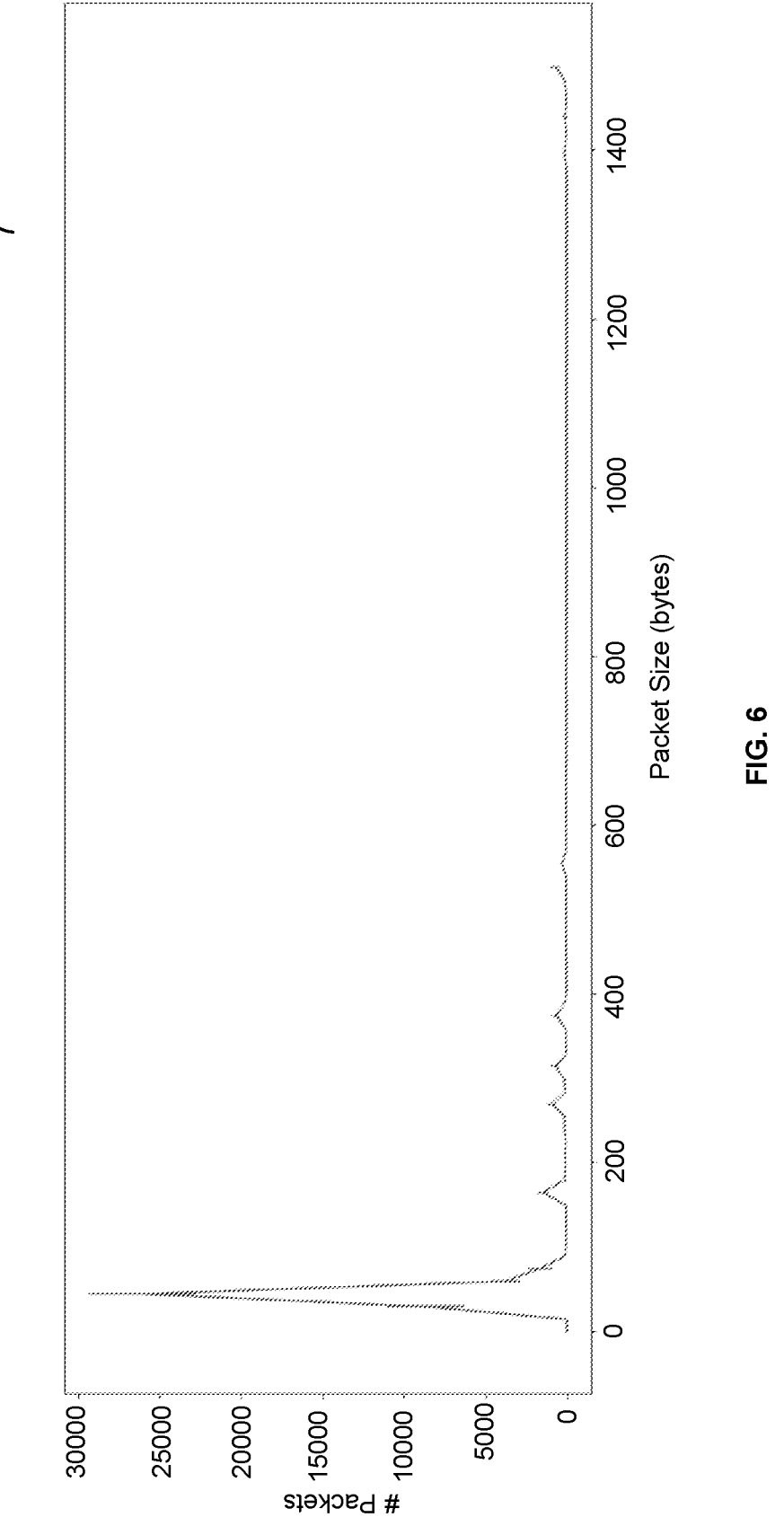
FIG. 6 is a diagram illustrating a distribution of packet sizes in an example embodiment.

According to the disclosed embodiments, the ingress traffic data may be further utilized to determine packet size distributions within a certain time period or a predetermined number of data packets. In an embodiment, a histogram reflecting the distribution of packet sizes is generated and examined. In an embodiment, the bin size of the histogram is predefined. In a further embodiment, the bin size may be determined for each victim server 120. It should be noted that a relatively wide distribution of packet sizes, including various request sizes, are expected during peace time when legit clients are operating. However, in an example embodiment, during an HTTPS flood attack, the attack tool can repeatedly send the same HTTPS request (with similar or same request sizes) and, thus, influence the packet size distribution. In the example embodiment, the packet distribution can be skewed to and/or concentrated at certain sized bins to display a notable change in distribution relative to that of peace times. An example plot illustrating a distribution of packet sizes are shown in FIG. 6.

In an embodiment, the traffic features may be utilized to reduce the number of false positive attacks detected in case of "flash crowd." For example, when a website initiates a sale campaign, the number of requests and responses loaded may be increased during the campaign due to legitimate users' activities. Thus, to offset such legitimate activities, rate-invariant features are considered, separately or in combination with rate-based features, when determining if the inspected traffic demonstrates an HTTPS flood attack, or that the increase in traffic is due to a legitimate increment in traffic and not due to attack tool activities.

Typically, HTTPS traffic, as generated by the attack tool 125, has different appearances "on the wire," as can be observed for legitimate client 120 traffic generated by WEB browsers or other legitimate user-agents. The attack tool 125 does not craft HTTPS requests as legitimate browsers do. That is, attack tools do not add well-crafted HTTP headers, WEB cookies, TLS/SSL headers or designate URLs typically requested by legitimate users to any, or most, requests or responses. In addition, an attacker, when activating the attack tool 125 to issue HTTPS floods attack, cannot follow same URL requests pattern as legitimate users do. The overall consequences of all these facts, the average size of HTTPS responses and requests generated by attack tools typically would be different (shorter or larger) than the size of HTTPS requests and responses of legitimate client device. The tools executing HTTPS flood attack would affect the average size, and therefore the distribution, of the generated HTTPS' requests and responses. As a result, the legitimate client's behavior is noisy with varied traffic patterns, and the attack tools issue a relatively constant and stable traffic pattern. It should be noted that the attack tool may issue similar, if not identical, HTTPS requests, and thus HTTPS responses, repeatedly at high volume.

According to the disclosed embodiments, the defense system 110 is configured to determine, or to otherwise compute, normal baselines for each traffic feature. The baselines are continuously determined at peace time and during predefined learning periods (e.g., a week, an hour, etc. that is used for learning the normal baseline). Once baselines are determined, the defense system 110 is configured to inspect all traffic directed to the victim server 130, compute the relevant traffic features, and determine any deviation of each or combination of traffic features from their respective baselines.

In an embodiment, a baseline is determined for each bin of the histogram created for each traffic feature. For example, the baseline is determined for each bin of packet arrival time that is FFT transformed by computing the exponential average (e.g., alpha of 0.01) and normalized. Once the baseline is determined, absolute differences in the current traffic histogram relative to the baseline are determined for each bin. For each time period (e.g., 3 seconds) or a predetermined number of HTTPS requests, an exponential average (e.g., alpha of 0.2) of the absolute differences of all bins are determined.

In an embodiment, the average of absolute differences is compared to a threshold as an indication of an attack. The threshold may be determined from the baseline to compute a maximal deviation of an observed traffic feature during peace time. Alternatively, the threshold may be determined based on a standard deviation technique computed based on the baseline. In an embodiment, a baseline may be determined for each client server and further, can be continuously and/or periodically updated.

It should be noted that the traffic inspected by the defense system 110 is performed without decrypting the traffic, but rather by gathering traffic data. Therefore, the defense system 110 does not need to maintain the encryption TLS/SSL, or other, decryption keys utilized by the client device 120 and the victim server 130. It should be appreciated that such traffic inspection, by eliminating a need for decryption, allows detection of attacks at various network protocols including, but not limited to, HTTP/2, HTTP/3, and the like, as well as in CDN, for improved security. The method for detecting HTTPS flood attacks is discussed in detail below.

According to some embodiments, upon detection of an HTTPS flood attack, one or more mitigation actions may be performed. As noted above, the mitigation action may be executed by the mitigation resource 112 in the defense system 110. The mitigation action may be, for example, blocking, or rate-limiting, of traffic from the client 120 to the server, challenge the client causing any traffic anomaly (e.g., CAPTCHA), redirecting the traffic to a scrubbing center for cleaning malicious traffic, and so on. In an embodiment, a mitigation action can start from challenging each entity (client device and/or attack tool) in the suspect list and end with a rate limiting applied on these clients or even blocking of these source IPs.

In the example deployment, the defense system 110 is connected in-line with the traffic between the client device 120 and the attack tool 125 toward the victim server 130. In this deployment, the defense system 110 is configured to process ingress traffic from the client device 120 and the attack tool 125 and egress traffic from the server 130. In yet another embodiment, when deployed in-line, the defense system 110 processes only ingress traffic from the client device 120 and the attack tool 125. The processed traffic is then transparently transferred to its destination (e.g., either the client device 120 and the attack tool 125 or the victim server 130).

It should be noted that although one client device 120, one attack tool 125, and one victim server 130 are depicted in FIG. 1 merely for the sake of simplicity, the embodiments disclosed herein can be applied to a plurality of clients and servers. The clients may be located in different geographical locations. The servers may be part of one or more datacenters, server frames, private cloud, public cloud, hybrid cloud or combinations thereof.

It should be further noted that in an embodiment, the defense system 110 is configured to receive, and thus process, only ingress (and not egress) traffic. Therefore, the defense system 110 needs to support these asymmetric network conditions when handling HTTPS flood attacks.

In some configurations, the victim server 130 may be deployed in a datacenter, a cloud computing platform, or on-premise of organization, and the like. The cloud computing platform may be a private cloud, a public cloud, a hybrid cloud, or any combination thereof. In addition, the deployment shown in FIG. 1 may include a content delivery network (CDN) connected between the client 120 and server 130.

FIG. 2 illustrates an always-on deployment 200 of the defense system 110 according to the disclosed embodiments. In the deployment 200, the defense system 110 is part of a cloud protection platform 201 being connected to a client device 210 and an attack tool 215 and a server 220 (which is the victim server 220) as discussed above. The victim server 220 is the entity to be protected from malicious threats. In an embodiment, the cloud protection platform 201 can be deployed as SaaS by third party cloud vendors.

The communication among the various components illustrated in FIG. 2 is over a network (network) using an application layer cryptographic protocol. Such a network may be, but is not limited to, a LAN, a WAN, the Internet, a cellular network, and a MAN, or any combination thereof. It should be noted that although one client device 210, one attack tool 215 and one victim server 220 are depicted in FIG. 2 merely for the sake of simplicity, the embodiments disclosed herein can be applied to a plurality of clients and servers. The clients may be located in different geographical locations. The server 220 may be part of one or more datacenters, server frames, a cloud computing platform (public, private, or hybrid) or combinations thereof.

The attack tool 215 carries out the malicious attacks against the victim server 220, and particularly carries out HTTPS flood attacks. The attack tool 215 can be a dedicated tool for performing the encrypted attack or can be an infected computing device. Again, it should be noted that the embodiments disclosed herein are applied when multiple attack tools execute the attacks against the victim server 220. Thus, the embodiments disclosed herein can also be used to detect and mitigate a large-scale attack campaign where a vast number of attack tools participate in attacking the protected entity, i.e., the victim server 220.

As noted above, the defense system 110 includes the detector 111 and the mitigation resource 112. According to the various embodiments, traffic between the victim server 220, the client 210 and attack tool 215 is transferred through the cloud protection platform 201. The traffic is inspected by means of the defense system 110. Any detected attack is mitigated within the cloud protection platform 201. Thus, only clean traffic is sent to the server 220.

In an embodiment, the detector 111 of the defense system 110 processes ingress traffic to detect and mitigate HTTPS flood attacks against the protected victim server 220. The detector 111 is configured to perform the various disclosed embodiments to detect HTTPS flood attacks.

The mitigation resource 112 is configured to perform, upon detection of an attack, one or more mitigation actions on traffic from the client 210 and/or attack tool 215 and forward legitimate clean traffic to the server 220. Examples for mitigation actions are discussed above.

In an embodiment, the cloud protection platform 201, and thus the defense system 110 receives, and thus processes only ingress traffic. Therefore, the secured datacenter 201 supports asymmetric network conditions when handling HTTPS flood attacks. It should be further noted that the deployment shown in FIG. 2 may include a content delivery network (CDN) connected between the client 210 and server 220, where the traffic is directed from the client 210.

In another configuration, the cloud protection platform 201 is configured to perform out-of-path mitigation. In such configuration, when an attack is detected, traffic is directed from the attack tool 215 and client 210 to the cloud protection platform 201 in order to mitigate the attack. Any clean traffic is forwarded to the victim server 220. An attack can be detected based on traffic data collected and analyzed without encrypting the traffic data.

In yet another configuration, a hybrid deployment of the defense system 110 and the cloud protection platform 201 is provided. In such deployment, a defense system is collocated to the victim server to process in-line traffic. When the defense system cannot efficiently mitigate a detected attack, e.g., due to the volume of the attack, the traffic is directed to the cloud protection platform 201. Typically, the cloud protection platform 201 would include high-capacity mitigation resources.

Figure 3:
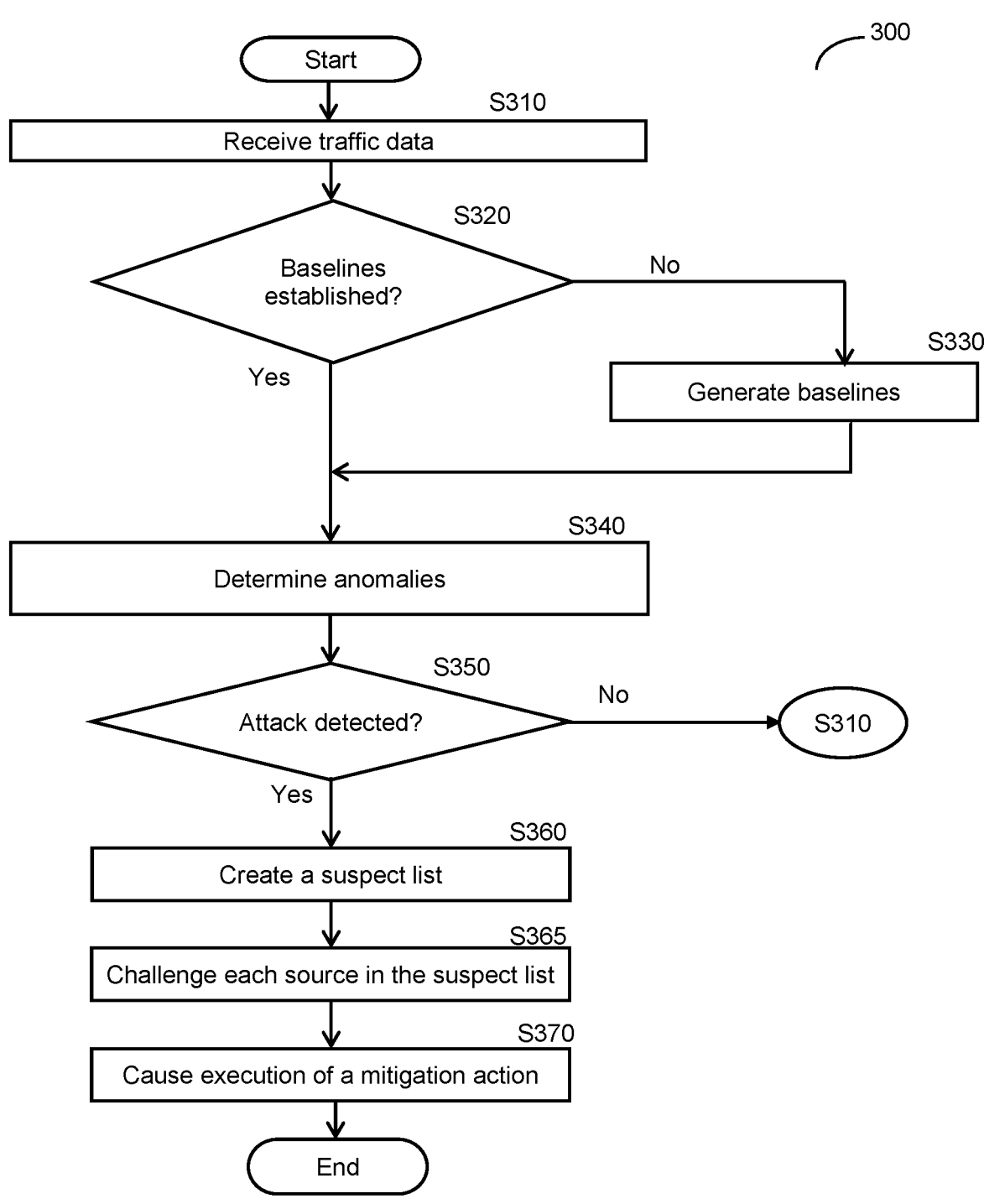
FIG. 3 is a flowchart describing a method for detecting and mitigating HTTPS flood attacks according to some embodiments.

FIG. 3 shows an example flowchart 300 illustrating the detection of HTTPS flood cyber-attacks according to an embodiment.

At S310, traffic data are received. In an embodiment, S310 includes capturing ingress (from the client to server) traffic for predefined time durations (e.g., 5 seconds). In another embodiment, the traffic data is received for a plurality of packets, for example, without limitation, of 50,000 packets, independent of the predefined time duration. In an embodiment, the traffic data includes, for example, but is not limited to, 5-tuple, request (or packet) size, arrival time, TCP flag, and the like, and any combination thereof. The traffic data received includes HTTPS request data packets as well as TCP signaling packets (e.g., ACK, SYN, etc.). In an embodiment, one or more traffic features are determined from the received traffic data. The traffic features include, but are not limited to, arrival times, interarrival times of pairs of packets, packet sizes, and the like. It should be noted that the traffic features are determined without decryption of data packets.

At S320, it is checked if the learning period has elapsed. If so, execution continues with S340; otherwise, at S330, at least one feature baseline is generated for each traffic feature. The learning period may be set to a predefined time window or until enough data is gathered and collected. A baseline is established during peace time or using data gathered at peace time, i.e., when no attack traffic is detected.

According to the disclosed embodiments, at least one baseline is continuously computed based on the received traffic data to determine normal activity of traffic features of the inspected traffic. In an embodiment, a baseline histogram of average (e.g., exponential average) and normalized bin values is generated for each traffic feature. In a further embodiment, a baseline distribution of packet arrival times in the frequency domain is generated to represent average and normalized bin values of the arrival times after FFT.

At S340, after baselining of the various traffic features, various deviations from these baselines are to be detected as traffic anomalies. In an embodiment, an anomaly detection is performed by comparing current histograms to the generated baselines representing peace time. The current histograms for each traffic feature are created by distributing current traffic into the predetermined bins of the respective traffic feature. The traffic features are extracted or derived from received traffic. In an embodiment, absolute differences (i.e., deviation from baseline values) for each bin are determined for the current histogram with respect to the baseline histogram. In a further embodiment, an average value for the time period (or predetermined number of packets) being inspected is determined from the absolute differences for each bin. The absolute differences for each bin are summed to compute an exponential average for the entire time period (or number of packets) of the traffic data. In an example embodiment, an alpha value for computing the exponential average may be predetermined.

In a further embodiment, the anomaly of the current traffic is detected from a deviation of the exponential average of the time period compared to a predetermined threshold value. In an example embodiment, the predetermined threshold value is determined from a maximal deviation of an observed traffic feature during peace time. In another example embodiment, the predetermined threshold value is defined as a standard deviation of an observed traffic feature during peace time. An alert is generated when the traffic data exceeds the threshold several times in a row, triggering an alarm. In an embodiment, the alert is generated based on an anomaly detected of at least one of the traffic features such as, but not limited to, packet arrival times, interarrival times of pairs of packets, packet sizes, and the like.

In another example embodiment, an anomaly is detected from a distribution of absolute differences determined from the current histogram and the baseline histogram. The current traffic is identified as an anomaly when the absolute difference distribution deviates (i.e., exceeds) a standard deviation or a predefined threshold deviation in one or more bins. For example, for the interarrival time traffic feature, the absolute difference distribution may be notably high in a few specific bins when an attack tool sends continuous HTTPS requests at high frequency at regular intervals compared to sporadic HTTPS requests from legitimate client servers.

In an embodiment, an anomaly alert is triggered only after configurable consecutive detections of such anomalies. In an embodiment, a predefined number (e.g., 5 or 10) of consecutive detections can be considered an alarm.

During peace time, a baseline is continuously computed over each bin probability in order to build the baseline distribution. The baseline is calculated as a long-term baseline.

In some embodiments, other traffic features such as, but not limited to, a number of HTTPS requests per second (RPS), HTTPS response sizes, a volume measured in bytes per second, a volume of HTTPS requests measured in bytes per second, a distribution of HTTPS requests sizes, a distribution of HTTPS response size, an ingress/egress ratio measured as the ratio between ingress number of HTTPS requests per second and an egress HTTPS response volume measured in byte per second, an egress/ingress ratio measured as the ratio between an egress HTTPS response volume in byte per second and an ingress number of requests per second, and the like, may be utilized for detecting abnormal activity.

At S350, based on the anomaly indications (detected anomalies), it is determined if an HTTPS flood attack is currently on-going. If so, execution continues with S360; otherwise, execution returns to S310. An attack is detected when an anomaly is measured on one or more traffic features. In an embodiment, the HTTPS flood DDoS attack is detected when the anomaly is detected in one or more traffic features such as frequency of arrival times of data packets, interarrival times of consecutive pairs of packets, packet sizes, the like, and distributions thereof.

At S360, upon detection or determination of an attack, a "suspect list" which may include a list of source IP addresses of client devices that trigger detection of anomalies, is created, or populated. At S365, each client device in the suspect list is challenged to determine if the client device is a bot (i.e., an attack tool) or operated by a real user.

At S370, execution of at least one mitigation action is initiated on each client device determined to be an attack tool. The mitigation action may include generating alerts, causing the client device (attack tool) to perform a compute challenge, redirecting traffic from the client to a scrubbing center, blocking client traffic, and so on, or a combination thereof.

In an embodiment, the suspect list is generated based on HTTPS requests size distribution and HTTPS response distribution. Client IP sources that their HTTPS requests, or responses, are part of anomalous bin in the histogram and therefore considered as candidate to the "suspect list."

In an embodiment, source IPs with large rate of HTTPS requests, or large volumes of HTTPS response, comparing to legitimate rate are considered as candidate to the "suspect list." In cases where the anomalous values returned to their normal values, the attack is terminated.

FIG. 4 is an example diagram 400 illustrating a distribution of packet arrival times in an example embodiment. The example diagram 400 shows a frequency domain spectrum of the packet arrival times measured in the ingress traffic as FFT amplitude (abstract) vs. frequency. The FFT amplitude is fairly steady at about 350 samples, but shows an increased peak of about 430 samples at about 995 Hz. Such an increase in FFT amplitude at a certain frequency suggests a steady rate of packet arrival times. It should be noted that the steady rate of packet arrival times can be correlated with steady HTTPS requests rates as expected from attack tools that, for example, send HTTPS requests at the highest rate possible.

It should be further noted that substantially constant FFT amplitudes are expected from normal ingress traffic due to noisy and intermittent requests for legit clients. In an embodiment, the distribution of packet arrival times is generated for baseline and current traffic and is compared as discussed above regarding FIG. 3.

FIG. 5 is an example diagram 500 illustrating a distribution of interarrival times in an example embodiment. The diagram 500 shows a portion of the interarrival time distribution where the increased number of packet pairs are
detected between 0.023 and 0.035 seconds. In an embodi-
ment, the increased number of packet pairs in comparison to
the baseline distribution (i.e., baseline histogram) indicates
the presence of anomaly. It is noted that HTTPS requests
from attack tools are sent at high rates and relatively at
similar rates. And thus, high packet pairs displaying similar
interarrival times can be an indication of an anomaly.

FIG. 6 is an example diagram 600 illustrating a distribu-
tion of packet sizes in an example embodiment. A large
number of packets are observed for packet sizes in the range
of 20 to 60 bytes. In an example embodiment, upon com-
parison to a baseline distribution, the large number of
packets in certain packet sizes is identified as an anomaly
and as an indication of an HTTPS flood attack. It should be
noted that an attack tool sending a high volume of packets
for HTTPS flood attacks (e.g., DDos attack) sends the same
request (i.e., same sized) repeatedly. In such a case, the
repeated request affects the packet size distribution and can
be detected through notably large volumes of packets in the
same size range.

Figure 7:
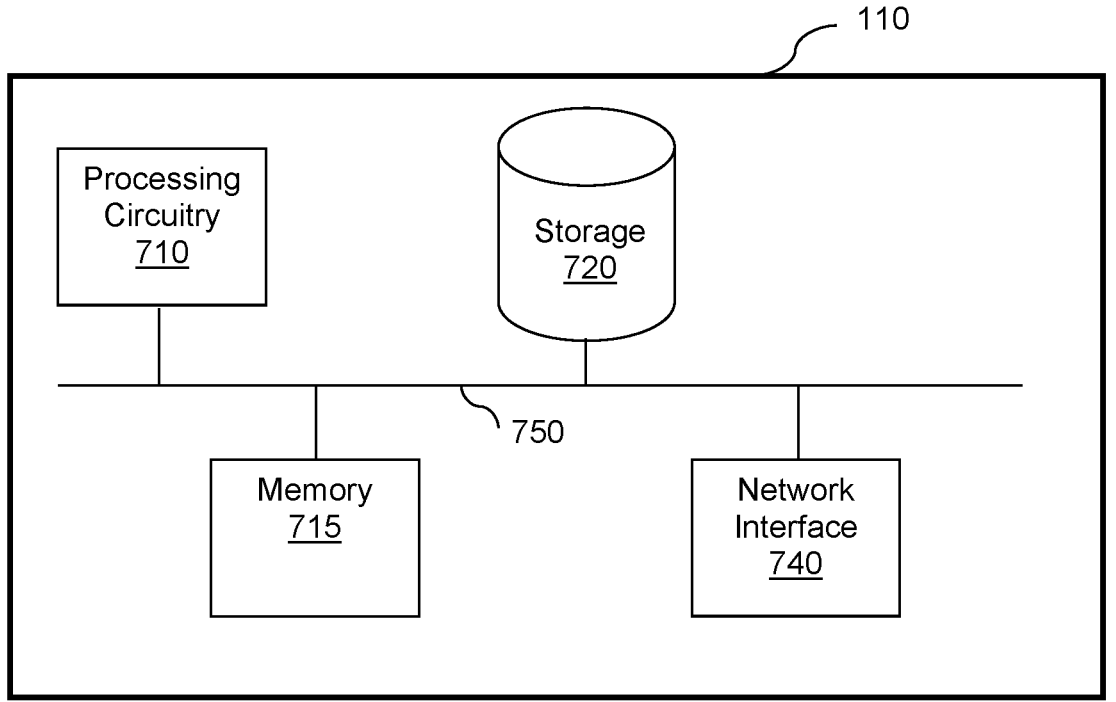
FIG. 7 is a block diagram of the defense system for detecting and mitigating encrypted attacks according to one embodiment.

FIG. 7 is an example block diagram of the defense system
110 implemented according to an embodiment. The defense
system 110 includes a processing circuitry 710 coupled to a
memory 715, a storage 720, and a network interface 740. In
another embodiment, the components of the defense system
110 may be communicatively connected via a bus 750.

The processing circuitry 710 may be realized as one or
more hardware logic components and circuits. For example,
and without limitation, illustrative types of hardware logic
components that can be used include field programmable
gate arrays (FPGAs), application-specific integrated circuits
(ASICs), Application-specific standard products (ASSPs),
system-on-a-chip systems (SOCs), general-purpose micro-
processors, microcontrollers, digital signal processors
(DSPs), and the like, or any other hardware logic compo-
nents that can perform calculations or other manipulations of
information.

The memory 715 may be volatile (e.g., RAM, etc.),
non-volatile (e.g., ROM, flash memory, etc.), or a combi-
nation thereof. In one configuration, computer readable
instructions to implement one or more embodiments dis-
closed herein may be stored in the storage 720.

In another embodiment, the memory 715 is configured to
store software. Software shall be construed broadly to mean
any type of instructions, whether referred to as software,
firmware, middleware, microcode, hardware description
language, or otherwise. Instructions may include code (e.g.,
in source code format, binary code format, executable code
format, or any other suitable format of code). The instruc-
tions, when executed by the one or more processors, cause
the processing circuitry 710 to perform the various processes
described herein. Specifically, the instructions, when
executed, cause the processing circuitry 710 to perform the
embodiments described herein.

The storage 720 may be magnetic storage, optical storage,
and the like, and may be realized, for example, as flash
memory or other memory technology, CD-ROM, Digital
Versatile Disks (DVDs), or any other medium which can be
used to store the desired information. The storage 720 may
include workflow schemes as described herein.

The processing circuitry 710 is configured to detect and
cause mitigation of HTTPS flood attacks, and any encrypted
DDos attacks as described herein.

The network interface 740 allows the defense system 110
to communicate at least with the servers and clients. It
should be understood that the embodiments described herein are not limited to the specific architecture illustrated in FIG.
7, and other architectures may be equally used without
departing from the scope of the disclosed embodiments.

The various embodiments disclosed herein can be imple-
mented as hardware, firmware, software, or any combination
thereof. Moreover, the software is preferably implemented
as an application program tangibly embodied on a program
storage unit or computer readable medium consisting of
parts, or of certain devices and/or a combination of devices.
The application program may be uploaded to, and executed
by, a machine comprising any suitable architecture. Prefer-
ably, the machine is implemented on a computer platform
having hardware such as one or more central processing
units ("CPUs"), a memory, and input/output interfaces. The
computer platform may also include an operating system
and microinstruction code. The various processes and func-
tions described herein may be either part of the microin-
struction code or part of the application program, or any
combination thereof, which may be executed by a CPU,
whether or not such a computer or processor is explicitly
shown. In addition, various other peripheral units may be
connected to the computer platform such as an additional
data storage unit and a printing unit. Furthermore, a non-
transitory computer readable medium is any computer read-
able medium except for a transitory propagating signal.

All examples and conditional language recited herein are
intended for pedagogical purposes to aid the reader in
understanding the principles of the disclosed embodiment
and the concepts contributed by the inventor to furthering
the art and are to be construed as being without limitation to
such specifically recited examples and conditions. More-
over, all statements herein reciting principles, aspects, and
embodiments of the disclosed embodiments, as well as
specific examples thereof, are intended to encompass both
structural and functional equivalents thereof. Additionally, it
is intended that such equivalents, i.e., both currently known
equivalents as well as equivalents developed in the future,
i.e., any elements developed that perform the same function,
regardless of structure.

As used herein, the phrase "at least one of" followed by
a listing of items means that any of the listed items can be
utilized individually, or any combination of two or more of
the listed items can be utilized. For example, if a system is
described as including "at least one of A, B, and C," the
system can include A alone; B alone; C alone; 2A; 2B; 2C;
3A; A and B in combination; B and C in combination; A and
C in combination; A, B, and C in combination; 2A and C in
combination; A, 3B, and 2C in combination; and the like.

It should be understood that any reference to an element
herein using a designation such as "first," "second," and so
forth does not generally limit the quantity or order of those
elements. Rather, these designations are generally used
herein as a convenient method of distinguishing between
two or more elements or instances of an element. Thus, a
reference to first and second elements does not mean that
only two elements may be employed there or that the first
element must precede the second element in some manner.
Also, unless stated otherwise, a set of elements comprises
one or more elements.

What is claimed is:
1. A method for detecting HTTPS flood cyber-attacks,
comprising:
   deriving traffic features from incoming traffic directed to
      a protected entity;
   converting at least one rate-based traffic feature of the
      derived traffic features into a frequency-domain repre-
      sentation by applying a Fast Fourier Transform (FFT);

determining if the derived traffic features represent at least one traffic anomaly using at least the frequency-domain representation of the at least one rate-based one of the derived traffic features, wherein the at least one traffic anomaly is a deviation from at least one baseline, wherein the at least one baseline is a normal distribution of traffic features of legitimate incoming traffic directed to the protected entity;

upon determining that the derived traffic features represent at least one anomaly, determining if the at least one anomaly characterizes an on-going HTTPS flood cyber-attack;

upon determining that there is the on-going HTTPS flood cyber-attack, populating a list of suspect source internet protocol (IP) addresses of devices triggered detection of the at least one anomaly;

challenging each device in the list of suspect source IP addresses to determine if a challenged device is an attack tool; and causing execution of a mitigation action on each client device determined to be an attack tool.

2. The method of claim 1, wherein the rate-based features include at least one of: arrival times of data packets and interarrival times of the data packets.

3. The method of claim 1, wherein determining if the derived traffic features represent at least one traffic anomaly using at least the frequency-domain representation of the at least one rate-based one of the derived traffic features, further comprises: comparing the frequency-domain representation of the at least one rate-based one of the derived traffic features to the at least one baseline in the frequency domain.

4. The method of claim 1, wherein determining if the derived traffic features represent at least one traffic anomaly further comprises:

determining histograms reflecting distribution of rate-invariant features of consecutive data packets from the incoming traffic, wherein a histogram is determined based on a predetermined number of data packets; and comparing the determined histograms to the at least one baseline to identify the deviation, wherein the comparison is performed without decrypting the incoming traffic.

5. The method of claim 4, wherein rate-invariant features include at least data features at least packet sizes.

6. The method of claim 1, wherein determining if the at least one anomaly characterizes an on-going HTTPS flood cyber-attack, further comprises:

determining if there are deviations from baselines representing normal distributions of rate-based features and rate-invariant data features.

7. The method of claim 1, further comprising:

continuously computing the at least one baseline based on incoming traffic data to determine normal activity of at least one of: rate-based and rate-invariant data features.

8. The method of claim 7, wherein continuously computing the at least one baseline further comprises:

computing normalized distributions of at least one of rate-based and rate-invariant data features.

9. The method of claim 8, wherein challenging each device in the list of suspect source IP addresses, further comprises: causing execution of at least one encrypted client web challenge against the client.

10. The method of claim 1, wherein the method is performed by a system deployed in-line of traffic of the protected.

11. The method of claim 1, wherein the method is performed by a system deployed in a cloud computing platform as always online deployed.

12. A non-transitory computer readable medium having stored thereon instructions for causing a processing circuitry to execute a process for detecting HTTPS flood cyber-attacks, the process comprising:

deriving traffic features from incoming traffic directed to a protected entity;

converting at least one rate-based traffic feature of the derived traffic features into a frequency-domain representation by applying a Fast Fourier Transform (FFT);

determining if the derived traffic features represent at least one traffic anomaly using at least the frequency-domain representation of the at least one rate-based one of the derived traffic features, wherein the at least one traffic anomaly is a deviation from at least one baseline, wherein the at least one baseline is a normal distribution of traffic features of legitimate incoming traffic directed to the protected entity;

upon determining that the derived traffic features represent at least one anomaly, determining if the at least one anomaly characterizes an on-going HTTPS flood cyber-attack;

upon determining that there is the on-going HTTPS flood cyber-attack, populating a list of suspect source internet protocol (IP) addresses of devices triggered detection of the at least one anomaly;

challenging each device in the list of suspect source IP addresses to determine if a challenged device is an attack tool; and causing execution of a mitigation action on each client device determined to be an attack tool.

13. A system for detection of HTTPS flood cyber-attacks, comprising:

a processing circuitry; and a memory, the memory containing instructions that, when executed by the processing circuitry, configure the system to:

derive traffic features from incoming traffic directed to a protected entity;

convert at least one rate-based traffic feature of the derived traffic features into a frequency-domain representation by applying a Fast Fourier Transform (FFT);

determine if the derived traffic features represent at least one traffic anomaly using at least the frequency-domain representation of the at least one rate-based one of the derived traffic features, wherein the at least one traffic anomaly is a deviation from at least one baseline, wherein the at least one baseline is a normal distribution of traffic features of legitimate incoming traffic directed to the protected entity;

upon determination that the derived traffic features represent at least one anomaly, determine if the at least one anomaly characterizes an on-going HTTPS flood cyber-attack;

upon determination that there is the on-going HTTPS flood cyber-attack, populate a list of suspect source internet protocol (IP) addresses of devices triggered detection of the at least one anomaly;

challenge each device in the list of suspect source IP addresses to determine if a challenged device is an attack tool; and cause execution of a mitigation action on each client device determined to be an attack tool.

14. The system of claim 13, wherein the rate-based features include at least one of: arrival times of data packets and interarrival times of the data packets.

15. The system of claim 13, wherein, to determine if the derived traffic features represent at least one traffic anomaly using at least the frequency-domain representation of the at least one rate-based one of the derived traffic features, the system is further configured to: compare the frequency-domain representation of the at least one rate-based one of the derived traffic features to the at least one baseline in the frequency domain.

16. The system of claim 13, wherein the system is further configured to:

determine histograms reflecting distribution of rate-invariant features of consecutive data packets from the incoming traffic, wherein a histogram is determined based on a predetermined number of data packets; and compare the determined histograms to the at least one baseline to identify the deviation, wherein the comparison is performed without decrypting the incoming traffic.

17. The system of claim 16, wherein rate-invariant features include at least data features at least packet sizes.

18. The system of claim 13, wherein the system is further configured to:

determine if there are deviations from baselines representing normal distributions of rate-based features and rate-invariant data features.

19. The system of claim 13, wherein the system is further configured to:

continuously compute the at least one baseline based on incoming traffic data to determine normal activity of at least one of: rate-based and rate-invariant data features.

20. The system of claim 19, wherein the system is further configured to compute normalized distributions of at least one of rate-based and rate-invariant data features.

21. The system of claim 20, wherein the system is further configured to:

cause execution of at least one encrypted client web challenge against the client.

22. The system of claim 13, wherein the system is deployed in-line of traffic of the protected.

23. The system of claim 13, wherein the system is deployed in a cloud computing platform as always online deployed.

* * * * *